(12) United States Patent
Williams

(10) Patent No.: US 6,398,023 B1
(45) Date of Patent: Jun. 4, 2002

(54) COMPUTER TOWER DISK STORAGE DEVICE

(76) Inventor: Mark Aaron Williams, 725 Ralston Ct., Mount Pleasant, SC (US) 29464

( * ) Notice: Subject to any disclaimer, the term of this patent is extended or adjusted under 35 U.S.C. 154(b) by 0 days.

(21) Appl. No.: 09/734,501

(22) Filed: Dec. 11, 2000

(51) Int. Cl.⁷ ............................................. B65D 85/57
(52) U.S. Cl. ................................. 206/308.1; 206/308.3
(58) Field of Search .............................. 206/307, 308.1, 206/308.3; D6/630; 211/41.12; 224/148.3, 241, 417, 430; 312/9.9; 361/683, 686; 364/705.01, 708.1; 369/273, 274, 291

(56) References Cited

U.S. PATENT DOCUMENTS

| | | | |
|---|---|---|---|
| 4,580,706 A | * 4/1986 | Jackson et al. | 224/430 |
| 4,651,872 A | 3/1987 | Joyce | |
| 5,217,119 A | 6/1993 | Hollingsworth | |
| D366,588 S | * 1/1996 | Gnant | D6/630 |
| 5,628,436 A | * 5/1997 | Jones et al. | 224/148.3 |
| 5,762,246 A | 6/1998 | Drew | |
| D398,471 S | * 9/1998 | Malik | D6/630 |
| 5,971,148 A | 10/1999 | Jackson | |
| 5,996,786 A | 12/1999 | MacGrath | |
| 6,105,763 A | 8/2000 | Saetia | |
| 6,106,015 A | * 8/2000 | Udwin et al. | 206/308.1 |
| 6,186,320 B1 | * 2/2001 | Drew | 206/308.1 |
| 6,202,839 B1 | * 3/2001 | Petersen et al. | 206/308.1 |

* cited by examiner

Primary Examiner—Luan K. Bui
(74) Attorney, Agent, or Firm—McNair Law Firm, P.A.; Robert R. Reed

(57) ABSTRACT

The present invention provides a canvass accessory device or "PC Saddlebag" that fits over the top of the computer tower and drapes down both sides of the tower. Both sides of the saddlebag have an inner and an outer side panels with pocket assemblies forming storage compartments for retaining a number of CDs in each assembly. The inner panels are integral with a top panel placed over the computer tower. The outer panels are integral with the bottom edge of the inner panels and fold upward to fasten at the top panel with fasteners in a closed configuration or vertical storage position. In the vertical storage position the outer panels can have exterior satchels and pouches accessible for document and disk storage. In an open configuration, the outer panels are released and rotated to expose the pocket assemblies on the inside surfaces of the outer panels and the outside surfaces of the inner panels where compact disks and computer software documents are organized and stored for easy retrieval and use. A carrying handle is attached to the top panel for removing the saddlebag from the computer tower and transporting it to another location in support of another computer.

19 Claims, 5 Drawing Sheets

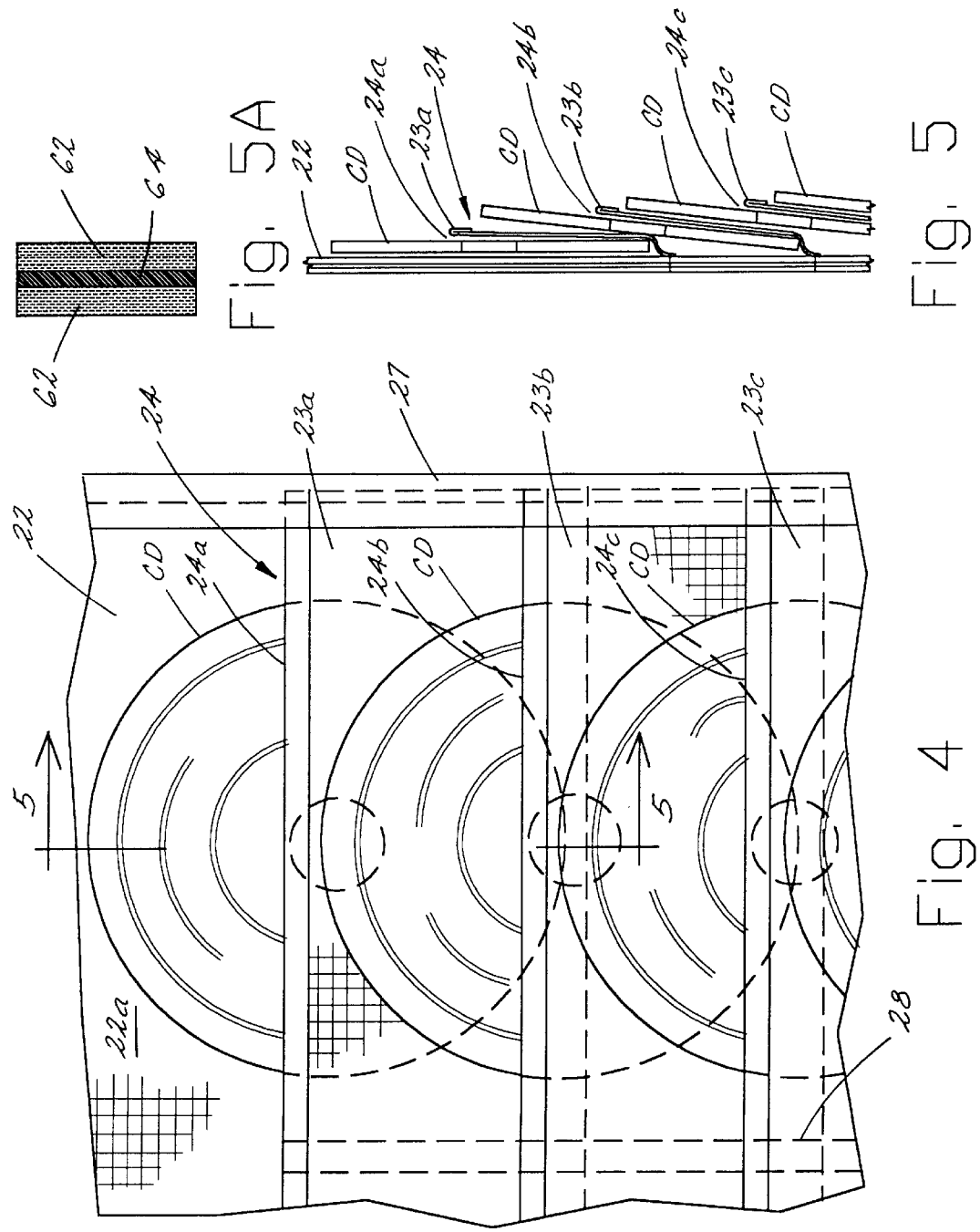

COMPUTER TOWER DISK STORAGE DEVICE

BACKGROUND OF THE INVENTION

This invention is directed to a case or storage device for organizing and accessing vital computer disks and software documents and, in particular, a foldable case or saddlebag storage device with pocket assemblies that is placed over a computer tower for retention of compact disks and documents which are organized and easily accessed when needed.

Many times when using a personal computer (PC), software installation and operational disks and diskettes are needed to resolve computer problems, store data or to initiate and reload a program in the computer. Most software program disks and data storage disks are kept in a storage chest or cabinet at a location somewhat remote from the computer itself. These operational devices are usually not organized and a user generally can not find what is needed. A need remains to have an accessory devise or case at the location of the computer without using valuable desktop, drawer or computer cabinet space. The accessory device must provide for easy access to a relatively large number of disks or diskettes in support of a number of programs installed or available to install in the computer and/or needed to repair computer problems, or restore backup data.

A laptop or portable PC represents an even larger challenge for having software devices near the computer for support of the programs being used in the PC. Typically the carrying case for a laptop computer has a limited number of storage compartments or enclosures for peripheral devices, writing implements, tools and the like. Carrying cases for laptop computers are disclosed in U.S. Pat. Nos.: 5,217,119; 5,971148; and 6,105.763. These references give some insight into what type of pockets are used to provide storage for computer supporting equipment. However, the special requirements required for nomadic computing makes these cases unsuitable for the single location PC with the broad range of software used with the PC.

Compact disk storage and display devices are disclosed in U.S. Pat. Nos: 4,651,872; 5,762,246; and 5,996,786. The recording disk storage apparatus of '786 includes a saddle shaped to fit over a computer component, such as a conventional computer tower. The storage apparatus has a plurality of box shaped cases which individually attach to the saddle placed over the computer tower. Access to stored recording disks is through a front door having a clear panel to visually observe the disks in each box shaped case. This means for storage and retrieval requires a strap to hold the saddle in place making the storage apparatus not portable. The use of compact disk storage pockets is illustrated in both the '246 and the '872 patents for storage at a remote location from the computer, or possibly a desk display location.

The need remains to provide storage for a large number of software installation disks, data storage disks and associated equipment and documents needed to support PC computer operations at a work station. Many times software installation disks needed to resolve computer problems can not be located. The storage device or case would provide immediate easy access to compact disks and documents critical to day-by-day operation of personal computers in a fast paced business environment. Access is at the location of the PC. In addition, a need exists to allow easy transporting of the compact disks (CDs) and equipment to another PC for parallel supporting requirements. Also, a need exists to remove data backup disks from the premises in case of fire or other catastrophic event. The storage and easy access accessory device or case is also referred to herein as a "PC Saddlebag".

Accordingly, an object of the present invention is to provide immediate and easy access to compact disks with read only memory data for computer operation and maintenance which is critical for day to day operation of personal computers.

Another object of the present invention is to provide computer users with a convenient accessory device for locating vital compact disks and diskettes in support of their PCs and its operating programs without using costly storage space.

Still another object of the present invention is to eliminate the loss of valuable software program disks and documentation in case of a fire and to reduce the time involved in finding the correct software support materials when needed.

A further object of the present invention is to provide a tote device or foldable case for transporting compact disks and documentation from place to place in support of more than one personal computer.

SUMMARY OF THE INVENTION

The above objectives are accomplished according to the present invention by providing a canvass accessory device or "PC Saddlebag" that fits over the top of the computer tower and drapes down both lateral sides of the tower. Both sides of the saddlebag have inner and outer side panels essentially equal in size. Each panel includes a pocket assembly for retaining a number of CDs in storage pockets of the assembly. The inner panels have top first edges integral with lateral edges of a top panel placed over the computer tower. The outer panels are integral at a hinged edge with a bottom second edge of the inner panels and rotate upward about the hinged edge to fasten at a top free edge to the top panel with fasteners in a storage configuration or vertical storage position. In the vertical storage position the outer panels can have accessible exterior satchels or pouches for additional storage of disks and documents. In an open configuration, a respective outer panel is released from the top panel and rotated about its hinged edge to expose a first pocket assembly on the inside surface of the outer panel and a second pocket assembly on the outside surface of a respective inner panel. Compact disks are organized and stored using the pocket assemblies for ease of retrieval and use. A carrying handle is attached to the top panel for removing the saddlebag from the computer tower and transporting it to another location in support of another personal computer, or removal of disks containing backup data from the premises to another remote location in case of fire or other catastrophic event.

In one embodiment of the invention an accessory device is provided for placement on a computer tower with a tower top and lateral sides so that compact disks and documents can be conveniently stored and accessed by a user. The accessory device comprises a top panel having lateral edges spaced apart to be positioned above the lateral sides of the computer tower when placed on the tower. A pair of inner side panels each having a top first edge, a bottom second edge and an outside surface is included. The top first edge coexists with a respective lateral edge of the top panel for vertically supporting the inner side panel at a respective lateral side of the computer tower. The device includes a first pocket assembly carried by the outside surface of the inner side panel for holding the disks and documents. A pair of outer side panels is included with each outer panel having a free third edge, a hinged edge coexisting with the bottom second edge of the inner side panel, an inside surface and an outside surface. The outer side panel is generally equal in size to a respective inner side panel and is capable of being rotated about the hinged edge to place the outer side panel in a vertical storage position and in a rotated access position. A second pocket assembly is carried by the inside surface of the outer side panel for holding the disks and documents. The disks and documents stored in either first or second pocket assemblies are accessed by a respective outer side panel being in the rotated access position.

In another embodiment of the invention, a foldable case is used in combination with a computer for conveniently locating computer software documentation and compact disks. The computer comprises a computer tower having a front, a top and lateral sides with lateral edges located at the intersection of the top with the lateral sides. The case comprises a top panel with lateral edges and a handle for placement of the top panel on the top of the computer tower so that the lateral edges are adjacent the lateral edges of the computer tower. A plurality of panels of the case are generally equal in size, for placement adjacent the lateral sides of the computer tower. Inner side panels of the plurality of panels have a top first edge and a bottom second edge with the top first edge being continuous with the lateral edges of the top panel for supporting the inner side panels adjacent to the lateral sides of the computer tower. Outer side panels of the plurality of panels each having a free third edge and a hinged edge where the hinged edge is formed to be continuous with the bottom second edge of the inner side panels. The outer side panels are rotated upward about the hinged edge and placed adjacent to the inner side panels to provide a vertical storage position. The free third edge of the side panels are fastened to the top panel to secure the vertical storage position or storage configuration of the outer side panels while maintaining access to the front of the computer tower. A plurality of pocket assemblies of the case include a pair of first pocket assemblies each carried by an outside surface of the inner side panel and a pair of second pocket assemblies each carried by an inside surface of the outer side panel. Each one of the plurality of pocket assemblies comprises a plurality of pocket flaps for organizing and storing the compact disks, wherein the disks are accessed by releasing a respective outer side panel from the top panel and rotating the outer side panel about the hinged edge of the outer side panel to a rotated access position to expose at least one of the plurality of pocket assemblies.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 4 is an elevation view of a portion of an inner side panel illustrating the first pocket assembly having pocket flaps for holding compact disks within panel pockets;

FIG. 5 is a cross-section view of the inner side panel taken along line 5—5 of FIG. 4 illustrating the compact disks being held by the pocket flaps;

FIG. 5A is a cross-section view of a typical side panel showing conventional canvass surfaces with a thin cotton sheet between the canvass surfaces.

DESCRIPTION OF A PREFERRED EMBODIMENT

Referring now in more detail to the drawings, the invention will now be described in more detail. The computer accessory storage device, foldable case or PC saddlebag fits over the top of a computer tower and side panels drape down the sides of the tower. The outer side panels of the device fold down to reveal storage assemblies for compact disks located on both the inner side panels and the outer side panels at each lateral side of the computer tower. A handle located on a top panel of the device makes the device portable so that compact disks and software documents can be transported from one PC location to another, or to a remote backup storage location. The reference herein to computer towers includes such computer hardware as work stations, network servers and the like which can support the PC saddlebag.

Figure 1:
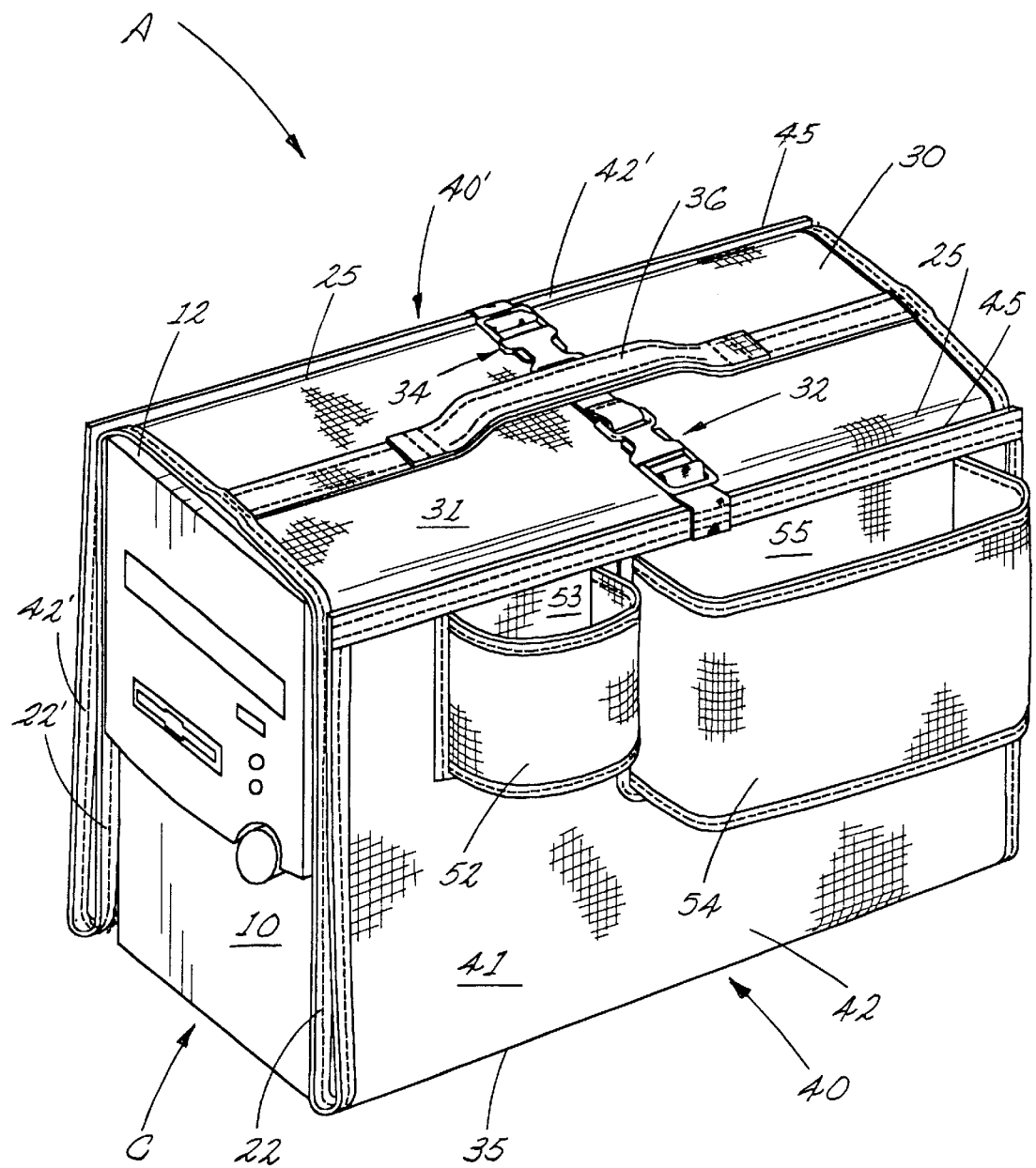
FIG. 1 is a perspective view of the PC saddlebag device of the invention placed over a computer tower and extending down both lateral sides of the tower with outer pouches accessible to the user.

The perspective view of FIG. 1 illustrates an accessory or saddlebag device or foldable case A used with a computer tower C for storage of compact disks and documents. The device having a top panel 30 placed over top 12 of the computer tower so that access to front face 10 of the tower is not restricted. Folded side panels extend down both lateral sides of the computer tower to provide storage compartments 40 and 40' conveniently located to the user. The most outward side panels from computer tower C are outer side panels 42 and 42'. The side panels located between the outer side panels and the computer tower are referred to as inner side panels 22 and 22'. The inner and outer side panels are essentially equal in size. The inner side panels are each integral at a top first edge 25 with lateral edges of top panel 30 to be vertically supported at a respective lateral side of the computer tower. The inner side panels are each integral with a respective outer side panel along a bottom second edge 35 of the inner side panel. The outer side panels are free to rotate about bottom second edges. Panel fasteners 32 and 34 are disposed between a free third edge 45 of the outer panel and top surface 31 of the top panel. The fasteners maintain the outer panels in a vertical storage position where access to storage compartments 40 and 40' is denied.

A handle 36 is used for placing the accessory device on the computer tower or removing the device from the computer tower. When removed, the accessory device is used as a foldable carrying case for the disks and documents. This feature allows the foldable case with its contents to be transported to the location of another computer and placed over another computer tower in support of the operation of the other computer. That is, the accessory device is portable and can be used in support of a number of computers within the scope of this invention.

In an alternate embodiment, an outside surface 41 of outer side panel 42 can support a plurality of satchels or pouches for storage and retrieval of additional disks and documents, as illustrated in FIG. 1. For example, a smaller pouch 52 is included for diskettes and the like where a larger satchel or pouch 54 can be used for software documents. Both pouches 52 and 54 are open at the top 53 and 55 respectively to receive diskettes and documents The outer side panel 42' can also have pouches. Other aspects of the invention include other size and number of pockets, as well as alternate locations, within the scope of this invention. One other pocket aspect is discussed in the sections which follow (see FIG. 6).

Figure 2:
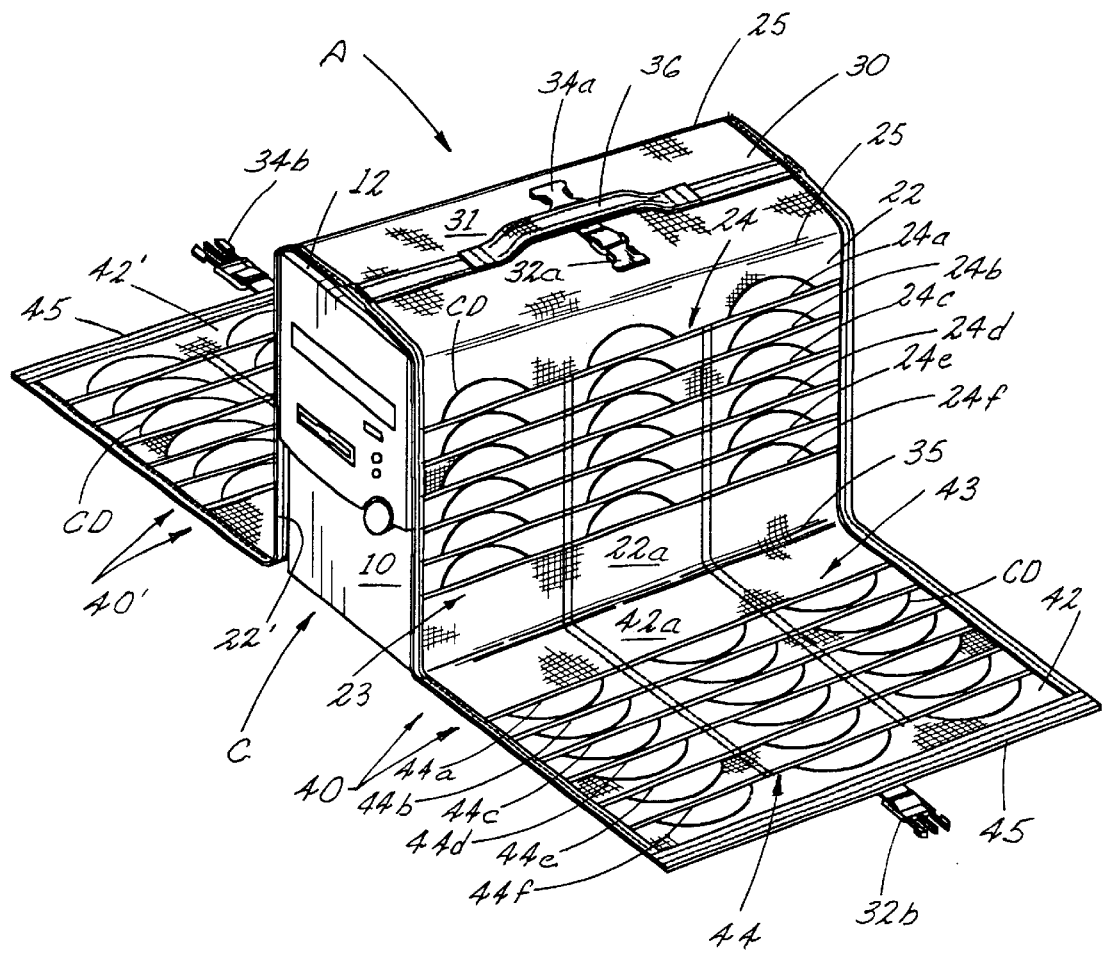
FIG. 2 is a perspective view of the saddlebag device of FIG. 1 with both outer side panels rotated to a horizontal position to illustrate access from the right side of the computer tower to first and second pocket assemblies of the invention having compact disks stored therein.

By releasing fasteners 32 and 34 at top panel 30 both outer side panels 42 and 42' can be rotated to a position allowing access to storage compartments 40 and 40', as illustrated in FIG. 2. Female fastener portions 32a and 34a remain attached to the top panel and male fastener portions 32b and 34b remain attached to free third edge 45 of the outer side panels 42 and 42'. Unlocking the outer side panels, so rotation can occur, is realized by releasing the locking arrangement between the male portion and the female portion. Alternately, only one fastener, 32 or 34, can be released to access either storage compartment 40 or 40'. The outer side panels are shown in a horizontal position. However, access to disks and documents is also possible by a limited rotation of the outer side panels about the hinged edge . The fasteners illustrated are shown as plastic hasps which push together and lock until released by squeezing on the male portions. Alternately, each fastener includes the male fastener portion with hook elements and the female fastener portion with loop elements forming a hook and loop fastener means. The locking arrangement is provided by the hook elements making contact with the loop elements and unlocking is realized by pulling the hook and loop elements apart.

A first pocket assembly 24 is supported from an outside surface 22a of inner side panel 22. The first pocket assembly includes a plurality of storage pockets 24a–24f formed by pocket flaps 23 attached to the inner side panel. Each panel pocket is designed and sized to hold compact disks side by side in rows, as illustrated in the perspective view of FIG. 2 taken from the right side of computer tower C. A second pocket assembly 44 is supported from an inside surface 42a of the outer side panel. The second pocket assembly includes a plurality of storage pockets 44a–44f formed by pocket flaps 43 attached to the outer side panel. Second pocket assembly 44 has preferably the same configuration as first pocket assembly 24 to assist with the organization of compact disks. The first and second pocket assemblies can be made different from one another for the special needs of the user within the scope of this invention.

Figure 3:
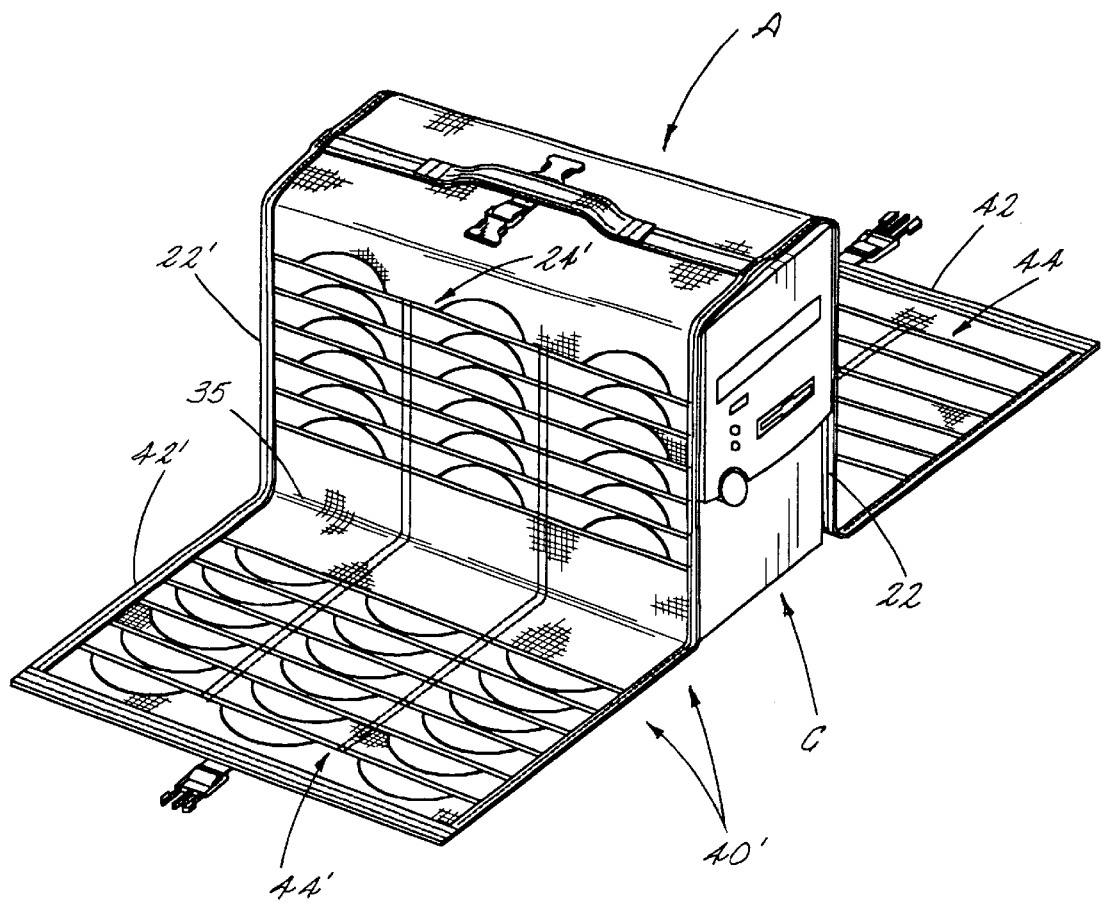
FIG. 3 is a perspective view of the saddlebag device of FIG. 1 with both outer side panels rotated to a horizontal position to illustrate access from the left side of the computer tower to first and second pocket assemblies of the invention having compact disks stored therein.

A perspective view from the left side of computer tower C is show in FIG. 3. This illustration shows accessory device A with the same general arrangement and configuration of pocket assemblies 24' and 44' as used with those previously described for side panels 22 and 42. This preferred symmetrical configuration permits the accessory device to be more economically manufactured and the compact disks to be easily organized. Once again, pocket assemblies 24' and 44' can be made different from one another and different from pocket assemblies 24 and 44.

The accessory device or foldable case can be used on computer towers of different size. Top first edge 25 is flexible enough to adjust to the width of the computer tower (FIG. 1). The vertical height of the side panels can also be made to conform to the height of the computer tower. Conventional computer towers in the industry have a height sufficient to allow the preferred number of disks to be stored, as illustrated in FIGS. 2 and 3 and discussed in the following paragraphs. In addition, either one of the top first edges is flexible enough to allow the device to be placed over a hangar with the inner side panels adjacent one with the other. In this configuration, the device containing disks can be hung in a closet or similar storage area.

Details of a preferred pocket assembly are illustrated in FIGS. 4 and 5. First pocket assembly 24 is associated with inside surface 22a of inner side panel 22. A plurality of pocket flaps 23a–23c are affixed to the inner side panel to provide a plurality of storage pockets 24a–24c, one for each compact disk CD placed in a respective pocket. The pocket flaps are held in place by extending under a panel edge element 27 and by sewing the pocket flaps to the inner side panel with a plurality of stitching lines 28 The cross-sectional view of FIG. 5 illustrates the overlapping arrangement of the flaps and compact disks one with the other. The bottom edge of each flap is also stitched to the inner side panel. The fasteners or hasps are preferably made of a plastic material with nylon straps for attaching the fasteners to respective panels.

A typical cross-sectional view of the preferred top and side panels is shown in FIG. 5A. The top and side panels are made of a with two layers 62 of conventional canvass material with a thin layer 64 of cotton between the canvass layers. Alternately, thin middle layer 64 can be made of a more rigid material, such as a plastic, to provide dimensional strength and rigidity to the side panels. Leather or conventional laminated plastic layers can also be used for the top and side panels. Edges 27 of the panels are preferably protected by folded edges or strips of the same material used for the panels. Edges can alternately be made of a plastic material folded over the edges of the canvass panels. Edges are typically finished by stitching along each exposed edge. The pouches are preferably of a conventional canvass or alternately made of a conventional plastic material. Pouches and pocket flaps can be made of a soft felt material to avoid any damage to compact disks and the like.

Figure 6:
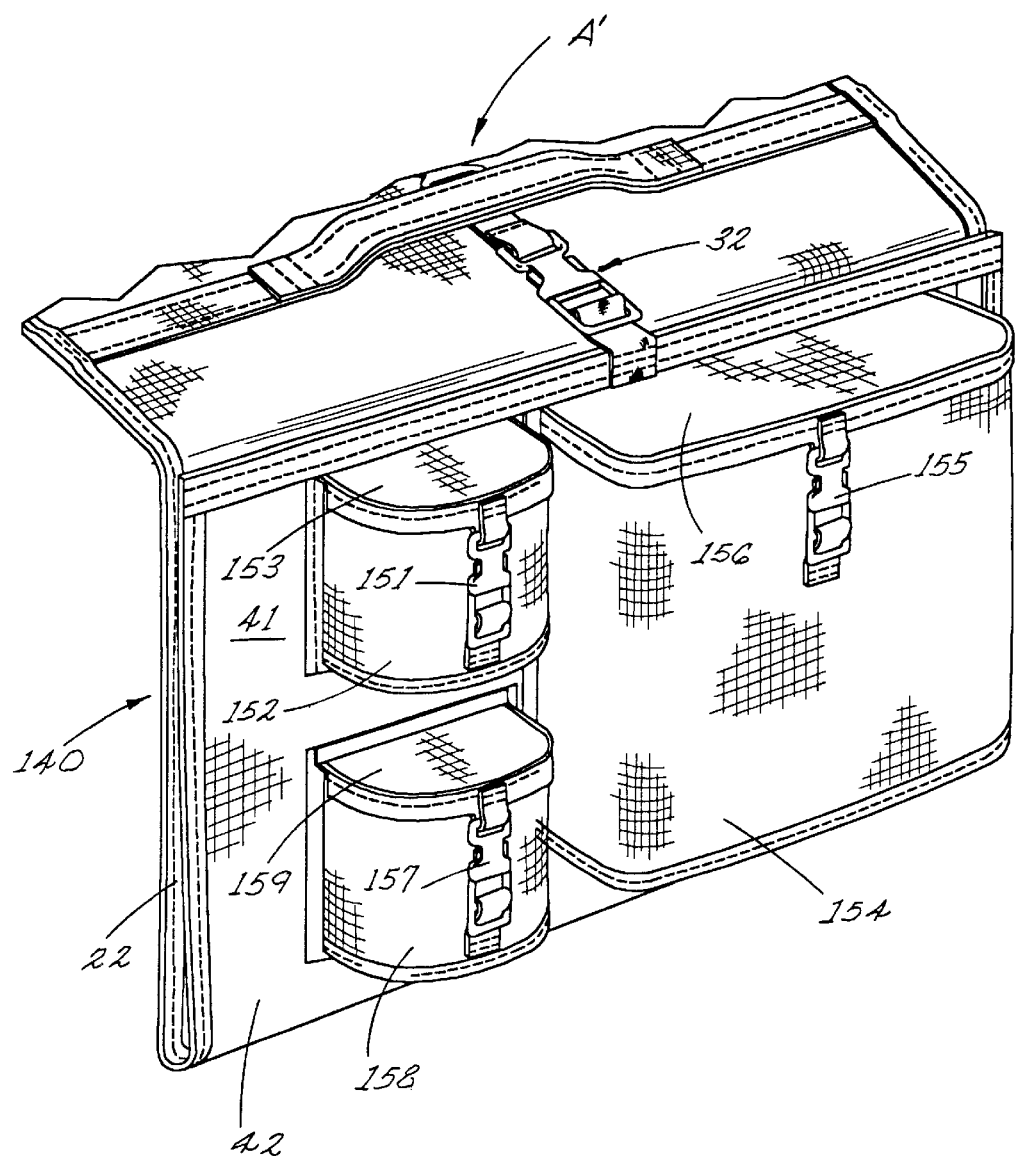
FIG. 6 is an perspective view of an inner side panel and an outer side panel where the outer side panel is in a stored vertical and latched position, wherein the outer surface of the outer side panel includes two first pouches and a larger second pouch according to another embodiment of the invention.

Another aspect of externally attached pouches is illustrated in FIG. 6. This perspective view of an accessory device or foldable case A' shows outer side panel 42 in a storage vertical position with the inner side panel 22. Fastener 32 holds the outer side panel adjacent the inner side panel to form a closed storage compartment 140. A plurality of pouches is included to provide increased storage space over the previous aspect illustrated in FIG. 2. The plurality of pouches includes a pair of first storage pouches 152 and 158 for storage and retrieval of the computer disks and a second storage pouch 154 larger than either one of said pair of first storage pouches for storing and retrieving the software documentation. Each first storage pouch of the plurality of pouches includes a pouch cover 153 or 159 rotatably attached to the outer side panel with a pouch fastener 151 or 157 connected between the first pouch and the pouch cover for maintaining the first pouch in a closed and secure pouch configuration. The second storage pouch of the plurality of pouches includes a pouch cover 156 rotatably attached to the outer side panel with a pouch fastener 155 connected between the second pouch and the pouch cover for maintaining the second pouch in a closed and secure pouch configuration. The present aspect of the pouch arrangement is the preferred aspect of the invention. However , the accessory device or foldable case can be provided without pouches within the scope of this invention.

The accessory device or PC saddlebag has a preferred size to store a number of compact disks along with other software documents. The individual storage spaces or pockets for compact disks are made to be 4 inches deep and 5.125 inches wide. The preferred number of spaces is 18 for each pocket assembly 24, 24', 44 or 44' with 36 spaces for each storage compartment 40 of 40' (see FIGS. 2 and 3). The total number of spaces for the preferred saddlebag is 72 spaces, for side panels about 14 inches high and about 18 inches in depth. The size of the computer tower is obviously a factor in sizing the saddlebag and other sizes are within the scope of this invention. The number and size of externally placed pouches can also be varied as previously disclosed.

While a preferred embodiment of the invention has been described using specific terms, such description is for illustrative purposes only, and it is to be understood that changes and variations may be made without departing from the spirit or scope of the following claims.

What is claimed is:

1. An accessory device for placement on a computer tower with a tower top and lateral sides so that compact disks and documents can be conveniently stored and accessed by a user of a computer, said device comprising:

a top panel having lateral edges spaced apart to be positioned above the lateral sides of the computer tower when placed on the tower;

a pair of inner side panels each having a top first edge, a bottom second edge and an outside surface, said top first edge co-extending with a respective lateral edge of said top panel for vertically supporting said inner side panel at a respective lateral side of the computer tower;

a first pocket assembly carried by said outside surface of said inner side panel for holding the disks and documents;

a pair of outer side panels each having a free third edge, a hinged edge coexisting with said bottom second edge of said inner side panel, an inside surface and an outside surface, wherein said each outer side panel is generally equal in size to a respective inner side panel and is capable of being rotated about said hinged edge to place said outer side panel in a vertical storage position and in a rotated access position; and a second pocket assembly carried by said inside surface of said outer side panel for holding the disks and documents, wherein the disks and documents stored in either first or second pocket assemblies are accessed by a respective outer side panel being in the rotated access position.

2. The device of claim I including a pair of fasteners each for fastening a respective outer side panel in said vertical storage position adjacent a respective inner side panel for storage of the disks and documents without said first and second pocket assemblies being accessible.

3. The device of claim 2 wherein said pair of fasteners each have a female fastener portion and a male fastener portion, wherein the outer side panel is held in said vertical storage position by placing said male fastener portion in a locking arrangement within said female fastener portion.

4. The device of claim 3 wherein said male fastener portion has hook elements and said female fastener portion has loop elements, wherein said locking arrangement is provided by said hook elements making contact with said loop elements.

5. The device of claim 1 wherein said first and second pocket assemblies each include a plurality of pocket flaps affixed to a respective side panel for holding a plurality of disks.

6. The device of claim 5 wherein said pocket flaps are attached by sewing each one of said flaps to a respective side panel to receive individual disks side by side and in rows for organizing the disks within said pocket assemblies.

7. The device of claim 1 including at least one storage pouch affixed to said outside surface of a respective outer side panel for storage and retrieval of compact disks and documents when said outer side panel is generally in said vertical storage position.

8. The device of claim 7 including a pair of first storage pouches with pouch covers and a second storage pouch with a pouch cover, said second storage pouch being larger than either one of said first storage pouches.

9. The device of claim 1 including a handle attached to said top panel for removing said top and side panels from said computer tower and transporting the disks and documents from place to place and to help organizing said disks within said pocket assemblies.

10. A foldable case used in combination with a computer for conveniently locating computer software documentation and compact disks, said case and computer comprising:

a computer tower of the computer having a front, a top and lateral sides with lateral edges located at the intersection of said top with said lateral sides;

a top panel of said case having lateral edges and a handle for placement of said top panel on said top of said computer tower such that said lateral edges are substantially adjacent said lateral edges of said computer tower;

a plurality of panels, generally equal in size, for placement adjacent said lateral sides of said computer tower;

inner side panels of said plurality of panels having a top first edge and a bottom second edge, said top first edge being continuous with said lateral edges of said top panel for supporting said inner side panels adjacent to said lateral sides of the computer tower;

outer side panels of said plurality of panels each having a free third edge and a hinged edge, said hinged edge formed to be continuous with said bottom second edge of said inner side panels so that said outer side panels are rotated upwardly about said hinged edge and placed adjacent to said inner side panels, wherein said free third edge is fastened to said top panel to provide a vertical storage position of said outer side panels while maintaining access to said front of said computer tower;

a plurality of pocket assemblies including a pair of first pocket assemblies each carried by an outside surface of a respective inner side panel and a pair of second pocket assemblies each carried by an inside surface of a respective outer side panel; and each one of said pocket assemblies comprising a plurality of pocket flaps for organizing and storing the compact disks, wherein the disks are accessed by releasing a respective outer side panel from said top panel and rotating said outer side panel about said hinged edge of said outer panel to a rotated access position to expose at least one of said pocket assemblies.

11. The case of claim 10 including a plurality of pouches affixed to an outside surface of at least one outer side panel.

12. The case of claim 11 wherein said pouches include a pair of first storage pouches for storage and retrieval of the computer disks and a second storage pouch larger than either one of said pair of first storage pouchs for storing and retrieving the software documentation.

13. The case of claim 12 wherein each pouch of said plurality of pouches includes a pouch cover rotatably attached to a respective outer side panel with a pouch fastener connected between said pouch and said pouch cover for maintaining said pouch in a closed pouch configuration.

14. The case of claim 10 including a pair of fasteners each for fastening a respective outer side panel to said top panel at said free third edge of said outer side panel for securing said vertical storage position of said outer panel.

15. The case of claim 14 wherein said pair of fasteners each have a female portion and a male fastener portion, wherein said outerside panel is placed in said vertical storage position by placing said male fastener portion in a locking arrangement within said female fastener portion.

16. The case of claim 15 wherein said male fastener portion has hook elements and said female fastener portion has loop elements, wherein said storage configuration is provided by said hook elements making contact with said loop elements.

17. The case of claim 10 wherein said pocket panels include pocket flaps formed to receive individual disks side by side and in rows for organizing the disks within said pocket assemblies.

18. The case of claim 10 wherein said top and side panels are made with outer layers of a conventional canvass material and a thin inner layer of a cotton material.

19. A personal computer saddlebag assembly for storage and retrieval of compact disks and software documents at a location of a computer and at a storage location remote from the computer, said assembly comprising:

a top horizontal panel having lateral edges and a supporting handle for transporting the disks and documents from place to place by hand;

a pair of inner side panels each having a top first edge, a bottom second edge and supporting a first pocket assembly for organizing and storing the disks and documents, said top first edge being continuous with said lateral edge of said top panel so that said inner panel extends generally in a vertical plane;

a pair of outer side panels each having a hinged edge and a free third edge and supporting a second pocket assembly for organizing and storing the disks and documents, said outer side panel being of a size generally equal to the size of the inner panel with said hinged edge coexisting with said bottom second edge of said inner panel, wherein said outer panel is disposed to rotate about said hinged edge for allowing access to the disks and documents; and a pair of fasteners each disposed between said free third edge of said outer panel and said top panel for holding said outer panel adjacent said inner panel such that said first and second pocket assemblies are enclosed between said inner and outer side panels.

* * * * *